Sept. 11, 1973    T. M. COOK ET AL    3,758,277

AMMONIUM NITRATE NEUTRALIZER

Filed June 11, 1971

United States Patent Office 3,758,277
Patented Sept. 11, 1973

3,758,277
AMMONIUM NITRATE NEUTRALIZER
Toby M. Cook, Gerald L. Tucker, and Marion L. Brown, Jr., Yazoo City, Miss., assignors to Mississippi Chemical Corporation, Yazoo, Miss.
Filed June 11, 1971, Ser. No. 152,063
Int. Cl. B01j 1/00; C01c 1/18
U.S. Cl. 23—285                               4 Claims

ABSTRACT OF THE DISCLOSURE

Highly dilute nitric acid is neutralized with ammonia by feeding the acid into an aqueous first reaction zone of a thermal siphon-pressure pump neutralizer, feeding ammonia into proximity to an aqueous second reaction zone, which is contiguous with said first reaction zone, and in circulating communication therewith in the neutralizer, circulating the nitric acid into the second reaction zone such that when the acid enters the second reaction zone its concentration is less than 15% and preferably less than 0.5 to 1%. A predominant proportion of the nitric acid is neutralized with the ammonia in the second reaction zone so as to form an ammonium nitrate containing solution. This solution is removed from the second reaction zone, recirculated to the first reaction zone, and is recovered as an ammonium nitrate product. Circulation for the process is facilitated by a thermal siphon and pressure effect caused by the exothermal heat of neutralization of the nitric acid with the ammonia and by the density differential between the product solution and the reacted solution.

BACKGROUND OF THE INVENTION

Field of the invention

This invention relates to a commercially feasible apparatus for neutralizing nitric acid with ammonia whereby the "smog" formation usually associated with such neutralization, is effectively avoided.

Description of the prior art

Ammonium nitrate is usually prepared by neutralizing nitric acid with ammonia. In the usual commercial process, this is accomplished by continuously feeding an aqueous solution of nitric acid and a stream of ammonia through opposing spargers into a neutralization vessel containing a solution of the reactants and products. As the neutralization proceeds, product concentration is increased by boiling off the water by the exothermal heat of reaction, which is then vented into the atmosphere. One difficulty with that commercial technique, however, is not only does the exothermal heat boil off water, it also causes the formation of a quantity of an unrecoverable vapor-like microparticulate ammonium nitrate fume. The fume, with unreacted ammonia and nitric acid, is eventually vented into the atmosphere in the form of an objectionable "smog." This smog can cause environmental damage by poisoning the surrounding air and possibly destroying nearby animal and plant life, and by creating an undesirable visual effect, making it objectionable to locate a neutralization plant near inhabited areas.

The reason for the "smog" formation seems to be that the exothermal heat generated from the nitric acid neutralization reaction, vaporizes a quantity of the acid, which then combines with the ammonia vapor to form ammonium nitrate microparticles, which are generally unrecoverable. This theory seems to be supported by the observation that the extent of ammonium nitrate smog is approximately proportional to the quantity of nitric acid vaporized.

In view of this theory, it was first contemplated to eliminate the smog formation by cooling the neutralization reactor contents, so as to reduce the quantity of nitric acid vaporized. While that expedient was successful in reducing smog formation, it has not proven to be entirely satisfactory from an economic point of view, since it meant the loss of the exothermal heat needed to evaporate the water contained in the weak reactant and product solution.

The use of more dilute nitric acid, likewise reduced smog formation, but it meant that a substantially greater quantity of water had to be evaporated in order to effectively concentrate the product ammonium nitrate to a usable strength.

Unable to solve the problem economically by eliminating the source of that problem, the art then relied upon various scrubbers, filters and condensers, designed to reduce the quantity of ammonium nitrate and the quantity of unreacted ammonia and nitric acid escaping into the atmosphere. Not only were the costs of such auxiliary equipment high and the costs of maintaining the equipment high, but those prior art techniques were unable to eliminate a sufficient amount of the ammonium nitrate microparticles to reduce the smog to acceptably low levels, unless total gas condensation was effected, which would result in undesirable quantities of waste material being discharged into the waste water stream.

Numerous attempts were made to redesign the basic nitric acid neutralizer equipment, so that volatilization of nitric acid could be reduced without deleteriously affecting the product concentration. None of these prior art techniques, however, were entirely successful in providing a commercially acceptable design which would sufficiently reduce the level of smog formation.

Attempts at such equipment redesign date as far back as 1939 with the Fauser neutralizer, U.S. patent application Ser. No. 306,071, published under the Alien Property Control Act. In that design, the reactor comprised a central reaction zone located concentrically within a vessel and in fluid flow communication therewith. The nitric acid was introduced directly into the central zone through a sparger located approximately adjacent to the entrance of the central zone. Ammonia was introduced into the vessel at some distance from the inlet to the central zone, and neutralization was effected as the ammonia entered the central zone from the outer vessel. Although that design reduced the extent of acid volatilization, it was insufficient to provide an acceptable low smog level. Moreover, that system required a vertical shaft mixer to circulate the aqueous solution between the central zone and the outer vessel, which was inefficient and increased the product cost.

Later systems were developed, such as those disclosed in Japanese Pat. No. 15,292/68 and Norwegian Pat. No. 15,958, which also used a Fauser type central zone, but they, likewise, fed the nitric acid in high concentrations directly into the core where neutralization occurred. All of these prior art systems were inadequate, since a high concentration of nitric acid was reacted with ammonia and hence the heat of reaction was sufficiently high to cause high degrees of acid volatilization.

A need existed, therefore, for a means of neutralizing nitric acid with ammonia in an economically efficient manner, with a minimum formation of the deleterious ammonium nitrate smog.

SUMMARY OF THE INVENTION

Accordingly, it is one object of this invention to provide an economically feasible nitric acid-ammonium neutralizer method which minimizes the extent of smog formation to acceptably low levels.

Another object of this invention is to provide an apparatus, which is simple in design, and which does not require auxiliary scrubbing equipment to reduce the smog formation to acceptably low levels.

These and other objects have now herein been attained by providing an apparatus in which nitric acid is diluted in a first reaction zone, which is contiguous with, and in fluid communication with, a second reaction zone; feeding ammonia into proximity to the inlet of the second reaction zone, and conducting the predominant portion of the neutralization within the second reaction zone. Circulation between the first and second zones is effected by the thermal siphon and pressure lift caused by the exothermal heat released during neutralization and by the density difference between the product solution as compared with the reactant solution. By proper alignment of the ammonia inlet with the inlet to the second reaction zone, a venturi-type constriction can be created to enhance mixing and to enhance the rate of recirculation.

DETAILED DESCRIPTION OF PREFERRED EMBODIMENTS

According to the present invention, nitric acid in a sufficiently low concentration is reacted with ammonia such that vaporization of the nitric acid is inhibited. Since the nitric acid is maintained essentially in the liquid state, the ammonium nitrate being formed will likewise be in a liquid state, and not in the undesirable vaporous or microparticulate state.

The lower the acid concentration, the lower will be the quantity of acid vaporized.

Some "smog" reduction occurs when the nitric acid concentration at the time of the reaction is as low as 15%, but really substantial smog reduction begins to occur when the nitric acid concentration is less than 2%. Exceptionally superior results occur at acid concentrations of between 0.5 and 1.0%, and most preferably, for best results, the acid concentration should be 0.5% or less. Since the concentration of product ammonium nitrate in prior art systems was generally dependent upon acid concentration, it is quite surprising that the present system can achieve an acceptably high product concentration without sacrifice to plant economy. Moreover, the present system can reduce the formation of ammonium nitrate smog down to levels approximating only 0.1% by weight or less of the stack gas effluent, or as little as several parts per million of air.

Figure 1:
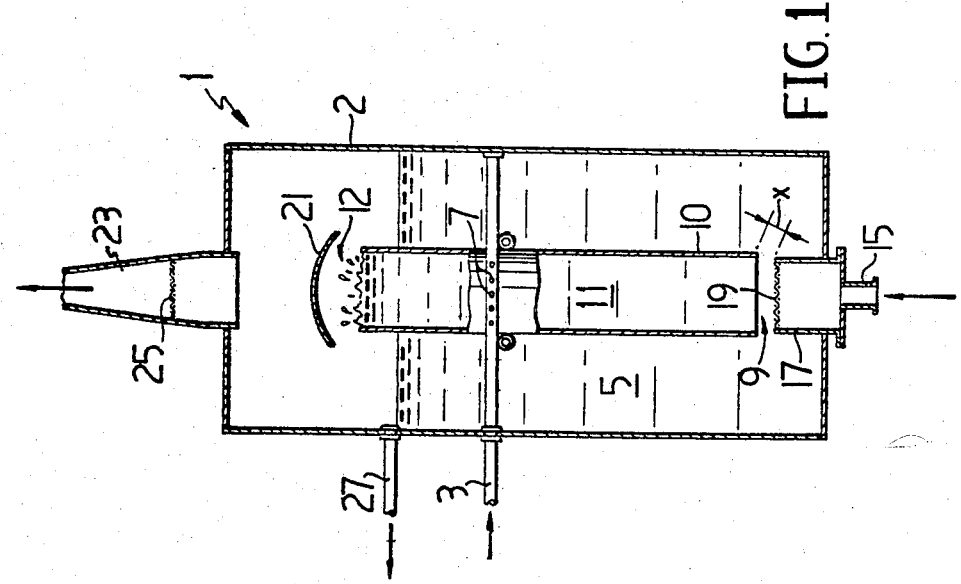
FIG. 1 is a schematic view of the neutralizer of the present invention.

Referring to FIG. 1, which is a schematic view of the reactor system 1 of the present invetntion, nitric acid enters inlet line 3 into a first reaction zone 5 of a reactor vessel 2 through sparger 7. A second reaction zone 11 is defined by an elongated fluid impervious cylindrical member 10 and is provided with an inlet 9 and an outlet 12. The cylindrical member 10 is positioned within the reaction vessel 2 such that when the vessel 2 contains an aqueous medium, the inlet 9 of the member 10 will be beneath the level of the medium in the first reaction zone and the outlet 12 of said cylindrical member will be above the level of the medium.

The nitric acid sparger 7 shown in FIG. 1 consists of four perpendicularly crossing pipes, each containing a plurality of small diameter nitric acid ports. The precise configuration of the nitric acid inlet is not critical, however, and it may take a variety of forms suitable for feeding nitric acid at a controlled rate, such as a simple pipe inlet, or a ringed sparger.

The acid entering the first reaction zone 5 may be highly dilute or may be in highly concentrated form. For best efficiency, the acid should be approximately in commercial concentrations of between 55 and 60%, which permits the production of ammonium nitrate in concentrations of 77 to 84%, which is a commercially usable form. Lower or higher acid concentrations, however, may be used. The only limitation is that the nitric acid inlet must be situated at a sufficient distance from the inlet 9 to the second reaction zone 11 such that when the nitric acid enters the second reaction zone 11, it will have the desired concentration as specified above.

The concentration of the nitric acid entering the second zone 11 is a function of the recirculation rate between the second zone 11 and the first zone 5, the distance between the nitric acid inlet sparger 7 and the second reaction zone inlet 9, and the concentration of the inlet nitric acid entering the system through sparger 7. Some additional control of the second zone inlet concentration can be provided by incorporating baffles between the sparger 7 and the inlet 9, or by otherwise varying the degree of turbulence in the first reaction zone.

Ammonia is introduced into the system 1 through an ammonia inlet sparger 15. Either ammonia vapor or ammonium hydroxide liquid or vapor may be used as the ammonia source. The incoming gas or vapor may contain amounts of carbonate, carbon dioxide or inert gas, depending upon the source of supply or depending upon the degree of concentration desired. One good supply source for ammonia is urea plant off-gas.

The ammonia enters into proximity to the second reaction zone inlet 9. It is preferable to feed the ammonia into the first reaction zone just adjacent to the inlet 9 and in the direction of that inlet. By proper spacing between the ammonia inlet 15 and the second reaction zone inlet 9, a constriction X can be created which will provide a venturi-like effect for the solution entering the second reaction zone 11, which serves to increase the rate of circulation and the degree of turbulence, and hence enhances the mixing of the ammonia and nitric acid reactants. The actual spacing X will depend upon the size of the particular unit and the ratio between the diameter of the walls of the cylindrical member 10 to the diameter of the walls of the ammonia inlet 17. The greater the value X, the smaller will be the venturi effect and the smaller will be the pressure drop. Of course, if the diameter ratio approaches 1:1, and the distance X is quite small, the rate of recirculation can be made to approach zero.

The respective diameters of the inner diameter of the reaction vessel 2, defining the first reaction zone 5, and the outer diameter of the walls of the cylindrical member 10, will also have an effect on the degree of pressure drop in the system. The ratio of vessel 2 diameter to cylindrical member 10 diameter should be small enough to create sufficient turbulence in the recirculating solution, but large enough that the system pressure drop is not excessive. Suitable ratios have been found between the ranges of 1.5:1 to 4:1.

Although the second reaction zone 11 is shown in the drawings as being defined by a single cylindrical member 10, a bundle consisting of a plurality of cylindrical members, i.e., 3 or 4 such members, may be used to get different pressure effects. The various members 10 may be separated by a finite distance within vessel 2 or may be attached in a circular arrangement. When more than one member 10 is used a single ammonia inlet 17 may be used, or multiple inlets may be used, one for each member, or one for several members.

The opening of the ammonia inlet 15 may be simply an open pipe, but preferably constructed so that the ammonia is evenly dispersed into the media. Good results have been obtained with a Number 4 mesh screen 19 having a 16.6 percent open area.

It is possible to introduce the ammonia directly into the second reaction zone 11, but this would decrease the extent of mixing and turbulence, and would decrease the rate of recirculation and could result in increased stack losses. Accordingly, introduction of the ammonia directly into the second zone 11 is acceptable, but is somewhat less efficient.

Since the ammonia, in the preferred design, is introduced just outside of the second reaction zone 11, neutralization will actually begin in the first zone 5, in advance of inlet 9. The predomnant amount of neutralization, however, will occur within the second reaction zone 11.

The exothermal heat released by the neutralization reaction will cause the water to boil, but because of the low acid concentration, vaporization of the nitric acid will be restrained.

Recirculation between the first and second reaction zones 5 and 11, is effected by the turbulent rise of gases through the aqueous medium within the second reaction zone 11, which acts as an air-lift, or pressure pump. Recirculation is also effected by the reduced density of the solution in the second reaction zone 11 as compared with that in the first reaction zone 5, which imparts a driving pressure head which will cause the solution to surge upwardly through outlet 12, so that it fountains above the level of the medium in the first and second reaction zones.

A curvilinear deflector 21 may be positioned above the outlet 12 so as to deflect the solution downwardly, back into the first reaction zone 5. Gases, possibly containing entrained liquid, will circumvent the deflector and will proceed out of the system through the vapor outlet 23. The deflector 21 should be so positioned that it does not adversely affect the circulation of the solution. If it is located too high above the second reaction zone outlet 12, it will lose its effectiveness of diverting the liquid back to the first reaction zone.

When properly positioned, liquid will run off the deflector in a continuous "sheet" or film, so that the gases circumventing the deflector will be forced to pass through the liquid curtain which will then serve to remove most of the entrained liquids.

The use of a deflector, however, is optional, and the same effect could be obtained by extending the column between the liquid medium and the vapor outlet high enough so that the entrained liquid will be permitted to agglomerate and fall back to the first reaction system.

The gases from the reaction may be vented directly into the atmosphere, since the quantity of ammonium nitrate, ammonia, and nitric acid entrained or vaporized, is quite low, and within ecologically acceptable limits.

If desired, however, the gases may be passed through a mesh mist remover so as to recover still further any entrained liquid particles. Any liquid entrapped in the mesh is permitted to drop back to the first reaction zone 5.

It may be desirable to increase the diameter of the reaction vessel above the deflector, as compared with the diameter of the vessel below the deflector, so as to reduce the space velocity of the vapors sufficiently that a large amount of the liquid entrained in the vapors will be able to drop out of the vapor and back into the first reaction zone.

Any of a variety of conventional separators or scrubbers may be added to the system to further remove vapor phase or liquid phase nitric acid or ammonia. It is extremely uneconomical and difficult to remove any vapor state or microparticulate ammonium nitrate in the exhaust fume, and accordingly, the neutralization technique itself must be capable of preventing the formation of such vapor state or microparticulate material within acceptable limits.

When the unit is operating with reasonable efficiency, the ammonium nitrate losses in the exhaust gas can be as low as 0.1% or lower.

An overflow ammonium nitrate outlet 27 is provided at, or near, the surface level of the solution in the first reaction zone 5, for removing the product from the system. The particular location for the product outlet 27 is not critical, but it should be above the level of the nitric acid inlet 3.

The nitric acid entering the sparger 7 is diluted by being admixed with the ammonium nitrate solution recirculated from the second reaction zone 11. As the nitric acid enters the second reaction zone 11, it is neutralized and removed by the ammonia. The acid concentration in the aqueous media, therefore, is considerably reduced as it leaves the second zone, and is returned to the first zone. The greater the rate of recirculation, the lower will be the acid concentration of the acid entering the second zone. Of course, the rate of recirculation is dependent upon many variables, including concentration of the inlet nitric acid, separation distance between the nitric acid and the ammonia spargers, size of equipment, and the like.

Good results have been obtained where the first reaction zone 5 contained 125 pounds of recycle per pound of commercially produced nitric acid feed, which corresponded to 0.5% nitric acid in the second zone inlet.

Under automatic pH control, it is not feasible to operate the neutralizer under neutral conditions; there will always be some free acid or ammonia in the product. If the concentration of the ammonia or nitric acid in the product is allowed to deviate too far from neutral, however, stack losses can become severe and seem to increase exponentially with acid concentration. It has also been found that more ammonium nitrate stack losses occur when the reaction is run slightly acidic than when it is run slightly basic.

If the reaction is conducted on the acidic side, the vapor pressure of nitric acid over the boiling nitric acid-water ammonium nitrate solution will primarily be a function of the nitric acid-to-water ratio in the solution. As the ammonium nitrate concentration is increased, while maintaining a constant acid concentration and a constant rate of recirculation, nitric acid vaporization will be increased due to the increased nitric acid/water ratio. The practical result is that as the concentration of the product is increased, the degree of nitric acid vaporized will be increased. To off-set this increased nitric acid loss, the rate of recirculation must be increased to reduce the nitric acid/water ratio and thereby to reduce the acid vapor pressure, but there is a practical limit as to the extent of recirculation possible.

Of course, when the system is run with excess ammonia, the neutralization reaction will begin as soon as the acid enters the first reaction zone, but th degree of neutralization usually is insignificant as compared with the degree of neutralization within the second reaction zone. This preneutralization, of course, is beneficial in that it further directly reduces the acid concentration and causes increased turbulence and recirculation, which still further reduces acid concentration.

In designing the equipment, the second reaction zone should be properly sized such that the residence time in that zone will be sufficient to permit the reaction to go to substantial completion before the solution surges out toward the deflector.

The surrounding solution level should be adjusted to a proper height to provide an adequate rate of recirculation. In general, the lower the liquid level, the slower will be the recirculation rate, since the smaller will be the pressure head. The longer the cylindrical member 10, defined in the second reaction zone 11, the greater will be the friction lossess within the zone, and the slower will be the rate of recirculation.

Although the neutralizer of this invention has been referred to as a thermal siphon neutralizer, the pumping action which provides for the recirculation between the first and second reaction zones, is actually a combination of two mechanisms: (1) the thermal siphon and (2) the air-lift pump. As ammonia enters the neutralizer, liquid flow is induced in the manner of an air-lift pump. The reaction between ammonia and the acid generates steam in the second reaction zone which sustains the air-lift pump. The temperature and density differences of the material inside and outside the second reaction zone induces flow in the manner of a thermal siphon reboiler.

Having now generally described the invention, a further understanding can be obtained by reference to certain specific examples which are provided herein for purposes of illustration only and are not intended to be limiting in any manner.

Figure 2:
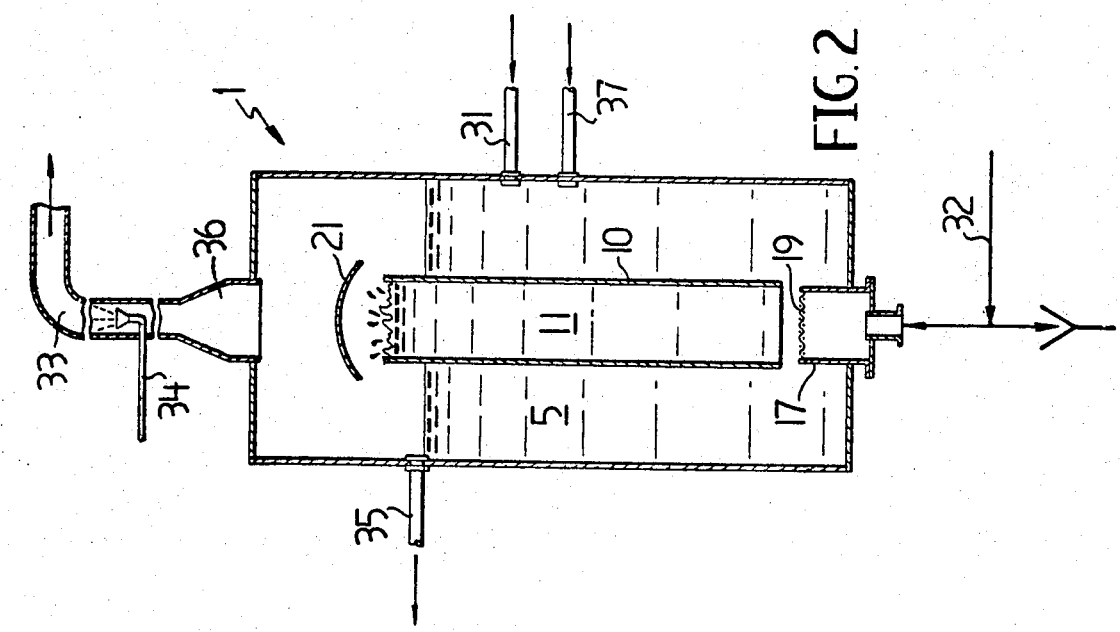
FIG. 2 is a schematic view of the neutralizer of the present invention with its auxiliary inlet and outlet systems.

The following examples will be discussed with repsect to the schematic of FIG. 2. Nitric acid of about 55% concentration enters the system 1 through line 31. Gaseous ammonia enters through line 32. A secondary feedstream 37 feeds material recovered from the separator scrubber (not shown). This feedstream is, of course, optional to the process.

Product ammonium nitrate is recovered through line 35 and steam and gaseous byproducts are exhausted through line 36. A water stream 34 may be fed into the exhaust stream to desuperheat that stream when using the optional scrubber. Stream 33 is exhausted into the atmosphere.

The results of several runs under acidic and basic conditions are shown in the following tables.

Having now fully described the invention, it will be apparent to one of ordinary skill in the art that many changes and modifications can be made thereto without departing from the spirit or scope of the invention.

Accordingly, what is claimed as new and intended to be covered by Letters Patent of the United States is:

1. A thermal siphon-pressure pump neutralizer being adapted for neutralizing nitric acid with ammonia comprising:

a reaction vessel suitable for containing an aqueous reaction medium and having a vapor outlet in its upper end and a product outlet spaced below said vapor outlet;

at least one elongated fluid impervious cylindrical member positioned substantially vertically within said vessel so as to define a second reaction zone within said member and a first reaction zone outside said member between said member and said vessel, the lower end of said cylindrical member being an inlet to said second reaction zone and the upper end being an outlet therefrom, and being situated in said vessel such that said inlet of said cylindrical member is spaced above the bottom of the vessel and said outlet of said cylindrical member is above the level of the product outlet of said vessel;

first cylindrical inlet means leading into the bottom of said reaction vessel being in close proximity to but spaced below said inlet of said cylindrical member in

TABLE I.—PROCESS FLOWS WITH PRODUCT SLIGHTLY ACIDIC (0.1% BY WEIGHT)

| Components | Stream | | | | | | |
|---|---|---|---|---|---|---|---|
| | 31 | 32 | 33 | 34 | 35 | 36 | 37 |
| $NH_3$, lb./hr | | 4,852 | 10 | | | 10 | |
| $HNO_3$, lb./hr | 17,678 | | | | 34 | | 8 |
| $H_2O$, lb./hr | 13,537 | 2,546 | 9,598 | | 8,734 | 9,598 | 2,249 |
| $CO_2$, lb./hr | | 783 | 783 | | | 783 | |
| $NH_4NO_3$, lb./hr | | | 10 | | 25,518 | 10 | 3,117 |
| Air, lb./hr | | | | | | | |
| Total, normal | 31,215 | 8,181 | 10,401 | | 34,286 | 10,401 | 5,374 |
| Total, maximum | 49,706 | 23,750 | 18,700 | 401 | 51,000 | 18,700 | 6,600 |
| Temperature, °F | 105 | 140 | 258 | 80 | 258 | 258 | 200 |
| Pressure, p.s.i.g | | | | 0.2 | | 0.2 | |
| Concentration, percent | 56.63 | | | | 75 | | 58 |
| Specific gravity | 1.326 | | | 1.0 | 1.295 | | 1.23 |
| M.P., °F | | | | 32 | | | |
| B.P., °F | | | | 212 | 258 | | 237 |
| Flow, g.p.m | 47 | | | | 53 | | 7.3 |
| Flow, a.c.f.m | | 3,345 | 4,750 | | | 4,750 | |

TABLE II.—PROCESS FLOWS WITH PRODUCT SLIGHTLY AMMONIACAL

| Components | Stream | | | | | | |
|---|---|---|---|---|---|---|---|
| | 31 | 32 | 33 | 34 | 35 | 36 | 37 |
| $NH_3$, lb./hr | | 4,852 | 100 | | 0.3 | 100 | |
| $HNO_3$, lb./hr | 17,678 | | | | | | 86 |
| $H_2O$, lb./hr | 13,537 | 2,546 | 9,598 | | 8,656 | 9,598 | 2,171 |
| $CO_2$, lb./hr | | 783 | 783 | | | 783 | |
| $NH_4NO_3$, lb./hr | | | 3 | | 25,656 | 3 | 3,117 |
| Air, lb./hr | | | | | | | |
| Total, normal | 31,215 | 8,181 | 10,484 | | 34,312 | 10,484 | 5,374 |
| Total, maximum | 49,706 | 23,750 | 18,700 | 401 | 51,000 | 18,700 | 6,600 |
| Temperature, °F | 105 | 140 | 258 | 80 | 258 | 258 | 200 |
| Pressure, p.s.i.g | | | | 0.2 | | 0.2 | |
| Concentration, percent | 56.63 | | | | 75 | | 58 |
| Specific gravity | 1.326 | | | 1.0 | 1.295 | | 1.23 |
| M.P., °F | | | | 32 | | | |
| B.P., °F | | | | 212 | 258 | | 237 |
| Flow, g.p.m | 47 | | | | 53.4 | | 7.3 |
| Flow, a.c.f.m | | 3,345 | 4,800 | | | 4,800 | |

The quantity of ammonium nitrate, ammonia and nitric acid emitted into the atmosphere by the apparatus of the present invention was compared with that emitted from the atmosphere by conventional neutralization equipment under similar reaction conditions, and the following data compiled.

TABLE IV.—PILOT UNIT STACK LOSS DATA FOR VARIOUS NEUTRALIZATION SCHEMES

| | Weight percent | | | Stack gas composition, weight percent of— | | |
|---|---|---|---|---|---|---|
| | Free $HNO_3$ in product | Free $NH_3$ in product | $HNO_3$ conc. entering reaction zone | $HNO_3$ | $NH_3$ | $NH_4NO_3$ |
| Case 1. Conventional neutralizer, product slightly acidic | 0.1 | 0.0 | Not measured | 0.0 | 0.26 | 0.31 |
| Case 2. Conventional neutralizer, product slightly ammoniacal | 0.0 | 0.037 | ___do___ | 0.0 | 0.50 | 0.20 |
| Case 3. Thermal syphon neutralizer, acid introduced inside central pipe, product slightly acid | 0.08 | 0.0 | ___do___ | 0.0 | 0.80 | 0.22 |
| Case 4. Thermal syphon neutralizer, acid introduced near entrance to central pipe, product slightly acidic | 0.08 | 0.0 | ___do___ | 0.0 | 0.21 | 0.24 |
| Case 5. Thermal syphon neutralizer, optimized design, product slightly acidic | 0.08 | 0.0 | 0.36 | 0.0 | 0.10 | 0.097 |
| Case 6. Thermal syphon neutralizer, optimized design, product slightly ammoniacal | 0.0 | 0.003 | 0.21 | 0.0 | 0.67 | 0.025 | axial alignment therewith, and having substantially the same diameter as said cylindrical member;

second inlet means leading into said first reaction zone being spaced a predetermined distance above said inlet of said cylindrical member and below the level of said product outlet of said vessel;

whereby, when said vessel contains an aqueous medium being filled at least to the level of said product outlet and nitric acid is introduced into said first reaction zone through said second inlet means and ammonia is introduced into the reaction vessel through said first inlet means, the concentration of the nitric acid will be diluted before entering said second reaction zone, and the major portion of nitric acid being introduced through said second inlet means will thereby be neutralized with ammonia being introduced through said first inlet means in said second reaction zone, circulation mixing and turbulence of the aqueous medium, nitric acid and ammonia between said first reaction zone and said second reaction zone being facilitated by a thermal siphon and pressure effect caused by the heat of neutralization and the density differential between the product solution and the reacted solution, such that water vaporized by said heat of neutralization will be discharged through said outlet of said reaction vessel and ammonium nitrate product will be recovered through said product outlet of said reaction vessel.

2. The thermal siphon-pressure pump neutralizer of claim 1, wherein a curvilinear deflector is supported above the cylindrical member outlet such that the solution fountaining from said member will be deflected downwardly back to said first reaction zone, and vapors emitted from said member outlet will circumvent said deflector and pass through the vapor outlet.

3. The thermal siphon-pressure pump neutralizer of claim 2, which further contains a mesh mist eliminator situated within the vapor outlet, which is capable of separating entrained liquid from the vapor stream passing through the outlet and permitting said liquid to drop back into said first reaction zone.

4. The thermal siphon-pressure pump neutralizer of claim 2, wherein a plurality of elongated fluid impervious cylindrical members are positioned within said vessel so as to define said second reaction zone.

References Cited

UNITED STATES PATENTS

| | | | |
|---|---|---|---|
| 2,386,681 | 10/1945 | Hadden | 23—285 X |
| 1,536,463 | 5/1925 | Westling | 23—271 X |
| 2,777,533 | 1/1957 | Segrest | 55—185 |

OTHER REFERENCES

Ser. No. 306,071, Fauser (A.P.C.), published Apr. 27, 1943.

JAMES H. TAYMAN, Jr., Primary Examiner

U.S. Cl. X.R.

23—259.1, 283, 274; 259—4, 95; 261—76, 121, 122, 77; 159—16 R; 423—396